(12) United States Patent
Wang et al.

(10) Patent No.: US 11,404,023 B2
(45) Date of Patent: Aug. 2, 2022

(54) FRAME RATE ADJUSTMENT METHOD AND TERMINAL

(71) Applicant: Huawei Device Co., LTD., Guangdong (CN)

(72) Inventors: Xu Wang, Shanghai (CN); Wei Du, Shanghai (CN); Weilai Zhou, Shanghai (CN); Song Du, Shenzhen (CN)

(73) Assignee: HUAWEI DEVICE CO., LTD., Guangdong (CN)

( * ) Notice: Subject to any disclaimer, the term of this patent is extended or adjusted under 35 U.S.C. 154(b) by 29 days.

(21) Appl. No.: 17/041,771

(22) PCT Filed: Mar. 26, 2018

(86) PCT No.: PCT/CN2018/080576
§ 371 (c)(1),
(2) Date: Sep. 25, 2020

(87) PCT Pub. No.: WO2019/183785
PCT Pub. Date: Oct. 3, 2019

(65) Prior Publication Data
US 2021/0012747 A1 Jan. 14, 2021

(51) Int. Cl.
*G06T 11/00* (2006.01)
*G09G 5/00* (2006.01)

(52) U.S. Cl.
CPC ......... *G09G 5/003* (2013.01); *G09G 2320/02* (2013.01); *G09G 2330/021* (2013.01)

(58) Field of Classification Search
CPC ............... G09G 5/003; G09G 2320/02; G09G 2330/021
See application file for complete search history.

(56) References Cited

U.S. PATENT DOCUMENTS

2009/0309885 A1    12/2009  Samson et al.
2012/0084058 A1    4/2012   Sowerby et al.
(Continued)

FOREIGN PATENT DOCUMENTS

CN    101699368 B    5/2012
CN    103246340 A    8/2013
(Continued)

*Primary Examiner* — Samantha (Yuehan) Wang
(74) *Attorney, Agent, or Firm* — Womble Bond Dickinson (US) LLP

(57) ABSTRACT

A frame rate adjustment method to reduce frame rate jitters in a display process includes: a terminal obtains a computing-access ratio relationship, where the computing-access ratio relationship is used to reflect a ratio between computing tasks and access tasks executed by the terminal; obtains a first working frequency table corresponding to the computing-access ratio relationship, where the first working frequency table includes CPU performance parameters generated when a DDR SDRAM and a CPU work on different working frequency combinations; selects from the first working frequency table based on the CPU performance parameter, a target CPU-DDR SDRAM working frequency combination that meets preset target frame processing duration; and instructs the DDR SDRAM to work on a target DDR SDRAM working frequency in the target CPU-DDR SDRAM working frequency combination, and instructing the CPU to work on a target CPU working frequency in the target CPU-DDR SDRAM working frequency combination.

19 Claims, 9 Drawing Sheets

(56) References Cited

U.S. PATENT DOCUMENTS

| | | | |
|---|---|---|---|
| 2015/0294647 A1* | 10/2015 | Roh | G09G 5/18 |
| | | | 345/214 |
| 2016/0078846 A1 | 3/2016 | Liu et al. | |
| 2017/0212581 A1 | 7/2017 | Park et al. | |
| 2019/0094941 A1* | 3/2019 | Sadasivam | G06F 1/324 |

FOREIGN PATENT DOCUMENTS

| | | |
|---|---|---|
| CN | 104484030 A | 4/2015 |
| CN | 104881104 A | 9/2015 |
| CN | 105045367 A | 11/2015 |
| CN | 105760094 A | 7/2016 |
| CN | 105913868 A | 8/2016 |
| CN | 106681833 A | 5/2017 |
| CN | 106933526 A | 7/2017 |

* cited by examiner

US 11,404,023 B2

FRAME RATE ADJUSTMENT METHOD AND TERMINAL

CROSS-REFERENCE TO RELATED APPLICATIONS

This application is a National Stage of International Application No. PCT/CN2018/080576, filed on Mar. 26, 2018, which is hereby incorporated by reference in its entirety.

TECHNICAL FIELD

Embodiments of this application relate to the field of communications technologies, and in particular, to a frame rate adjustment method and a terminal.

BACKGROUND

A frame rate (also referred to as frames per second or FPS) refers to a quantity of image frames that a display refreshes per second. A higher frame rate indicates better continuity of changed images watched by human eyes. Currently, when a terminal such as a mobile phone performs display, the terminal usually refreshes content of a display image at a fixed frame rate (for example, 60 Hz). In other words, duration (referred to as frame processing duration in the embodiments of this application) spent by a central processing unit (CPU) in the mobile phone in processing each frame is about 16.7 ms (namely, is/60 Hz). When the CPU has an insufficient processing capability or the mobile phone is overheated, the frame rate decreases. If the CPU processes one frame for more than 16.7 ms, a frame loss occurs. In this case, a user may experience frame freezing when using the mobile phone.

In this case, to enable the frame rate to be stable at about 60 Hz to ensure smoothness of display images, a real-time frame rate of a current display image may be detected. When the real-time frame rate exceeds an upper limit of a preset range, a frequency modulator in the mobile phone may decrease a working frequency of the CPU, or when the real-time frame rate is lower than a lower limit of the preset range, the frequency modulator may increase the working frequency of the CPU.

However, a speed at which the CPU processes each frame of display image is determined by both a computing capability of the CPU and an access capability of a double data rate (DDR) synchronous dynamic random access memory (DDR SDRAM SDRAM). In a compute-intensive application scenario, increasing the working frequency of the CPU can significantly reduce a processing time of a display image. However, in a memory-intensive application scenario (for example, a game scenario), increasing the working frequency of the CPU slightly reduces the processing time of the display image. In this case, blindly increasing the working frequency of the CPU cannot resolve a frame rate jitter, but further increases power consumption of the mobile phone.

SUMMARY

Embodiments of this application provide a frame rate adjustment method and a terminal, to reduce frame rate jitters in a display process and reduce power consumption of the terminal.

To achieve the foregoing objective, the following technical solutions are used in the embodiments of this application.

According to a first aspect, an embodiment of this application provides a frame rate adjustment method, including the following operations: A terminal obtains a current computing-access ratio relationship as a first ratio relationship, where the computing-access ratio relationship may reflect a ratio between computing tasks and access tasks that are executed by the terminal. The terminal obtains a first working frequency table corresponding to the first ratio relationship, where the first working frequency table includes CPU performance parameters generated when a DDR SDRAM and a CPU work on different working frequency combinations and the computing-access ratio relationship is the first ratio relationship, and the CPU performance parameter is used to reflect frame processing duration required by the CPU to process one frame of display image. In this way, the terminal can select, from the first working frequency table based on the CPU performance parameter, a target CPU-DDR SDRAM working frequency combination that meets preset target frame processing duration, where the target CPU-DDR SDRAM working frequency combination includes a group of a target CPU working frequency and a target DDR SDRAM working frequency. Subsequently, the terminal may instruct the DDR SDRAM to work on the target DDR SDRAM working frequency, and instruct the CPU to work on the target CPU working frequency, so that the target frame processing duration is met when the CPU subsequently processes each frame of display image.

In other words, because the CPU is mainly configured to execute the computing tasks, and the DDR SDRAM is mainly configured to execute the access tasks, in this application, if the computing tasks are relatively intensive currently, the terminal may set the CPU to work on a relatively high working frequency, so that the CPU can process these computing tasks more quickly. Correspondingly, if the access tasks are relatively intensive currently, the terminal may set the DDR SDRAM to work on a relatively high working frequency, so that the DDR SDRAM can process these access tasks more quickly. In this way, the terminal can dynamically and properly set the working frequencies of the DDR SDRAM and the CPU based on current distribution statuses of the computing tasks and the access tasks, so that frame processing duration for each frame of display image is steadily less than the target frame processing duration, to improve smoothness of display images.

In one embodiment, that a terminal obtains a current computing-access ratio relationship as a first ratio relationship specifically includes: The terminal obtains, from a performance monitor of the CPU, a first parameter used to reflect computing performance of the CPU and a second parameter used to reflect access performance of the DDR SDRAM; and the terminal uses a ratio between the first parameter and the second parameter as the first ratio relationship, where the first ratio relationship may reflect whether a current display scenario is a memory-intensive display scenario or a compute-intensive display scenario.

In one embodiment, when the terminal selects, from the first working frequency table, the target CPU-DDR SDRAM working frequency combination that meets the target frame processing duration, because the CPU performance parameter in the first working frequency table is used to reflect the frame processing duration required by the CPU to process one frame of display image, the terminal may select, based on the CPU performance parameter in the first working frequency table, a CPU-DDR SDRAM working frequency combination corresponding to frame processing duration less than the target frame processing duration as the target CPU-DDR SDRAM working frequency combination.

In one embodiment, before the terminal selects, from the first working frequency table, a target CPU-DDR SDRAM working frequency combination that meets target frame processing duration, the method may further include: the terminal detects first actual frame processing duration spent by the CPU in processing a current frame of display image; and the terminal obtains an actual CPU-DDR SDRAM working frequency combination used when the CPU and the DDR SDRAM process the current frame of display image.

In this case, that the terminal selects, from the first working frequency table, a target CPU-DDR SDRAM working frequency combination that meets target frame processing duration specifically includes: The terminal searches the first working frequency table for an actual CPU performance parameter corresponding to the actual CPU-DDR SDRAM working frequency combination. Further, the terminal may determine, in the first working frequency table, a target CPU performance parameter that meets a first preset relationship. The first preset relationship is: the target CPU performance parameter≥(the first actual frame processing duration/the target frame processing duration)×the actual CPU performance parameter. In this way, the terminal can use a CPU-DDR SDRAM working frequency combination corresponding to the target CPU performance parameter in the first working frequency table as the target CPU-DDR SDRAM working frequency combination.

In one embodiment, the first working frequency table may further include power consumption overheads required when the DDR SDRAM and the CPU work on different working frequency combinations. The target CPU-DDR SDRAM working frequency combination is a CPU-DDR SDRAM working frequency combination that meets the target frame processing duration and that corresponds to lowest power consumption overheads. In this way, it can be ensured that frame processing duration or a frame rate of the CPU is steadily less than the target frame processing duration, and further, the power consumption overheads required when the DDR SDRAM and CPU work can be minimized.

In one embodiment, the frame rate adjustment method further includes: The terminal selects, from a preset second working frequency table, a target GPU working frequency that meets the target frame processing duration, where the second working frequency table includes GPU performance parameters generated when a GPU works on different working frequencies, and the GPU performance parameter is used to reflect frame processing duration required by the GPU to process one frame of display image; and further, the terminal may instruct the GPU to work on the target GPU working frequency. In this way, when each frame of display image is processed, the frame processing duration of the GPU may be steadily less than the target frame processing duration, so that the smoothness of display images can be further improved.

In one embodiment, before the terminal selects, from a second working frequency table, a target GPU working frequency that meets the target frame processing duration, the method further includes: The terminal detects second actual frame processing duration spent by the GPU in processing the current frame of display image; and the terminal obtains an actual GPU working frequency used when the GPU processes the current frame of display image.

In this case, that the terminal selects, from a second working frequency table, a target GPU working frequency that meets the target frame processing duration specifically includes: The terminal searches the second working frequency table for an actual GPU performance parameter corresponding to the actual GPU working frequency. Further, the terminal may determine, in the second working frequency table, a target GPU performance parameter that meets a second preset relationship. The second preset relationship is: the target GPU performance parameter≥(the second actual frame processing duration/the target frame processing duration)×the actual GPU performance parameter. In this way, the terminal can use a GPU working frequency corresponding to the target GPU performance parameter in the second working frequency table as the target GPU working frequency.

In one embodiment, the second working frequency table further includes power consumption overheads required when the GPU works on different working frequencies. The target GPU working frequency is a GPU working frequency that meets the target frame processing duration and that corresponds to lowest power consumption overheads. In this way, it can be ensured that frame processing duration or a frame rate of the GPU is steadily less than the target frame processing duration, and further, the power consumption overheads required when the GPU works can be minimized.

According to a second aspect, an embodiment of this application provides a terminal, including: an obtaining unit, configured to: obtain a current computing-access ratio relationship as a first ratio relationship, where the computing-access ratio relationship is used to reflect a ratio between computing tasks and access tasks that are executed by the terminal; and obtain a first working frequency table corresponding to the first ratio relationship, where the first working frequency table includes CPU performance parameters generated when a DDR SDRAM and a CPU work on different working frequency combinations and the computing-access ratio relationship is the first ratio relationship, and the CPU performance parameter is used to reflect frame processing duration required by the CPU to process one frame of display image; a determining unit, configured to select, from the first working frequency table based on the CPU performance parameter, a target CPU-DDR SDRAM working frequency combination that meets preset target frame processing duration, where the target CPU-DDR SDRAM working frequency combination includes a group of a target CPU working frequency and a target DDR SDRAM working frequency; and an instruction unit, configured to: instruct the DDR SDRAM to work on the target DDR SDRAM working frequency, and instruct the CPU to work on the target CPU working frequency.

In one embodiment, the terminal further includes a calculation unit; the obtaining unit is further configured to obtain, from a performance monitor of the CPU, a first parameter used to reflect computing performance of the CPU and a second parameter used to reflect access performance of the DDR SDRAM; and the calculation unit is configured to use a ratio between the first parameter and the second parameter as the first ratio relationship.

In one embodiment, the determining unit is specifically configured to select, based on the CPU performance parameter in the first working frequency table, a CPU-DDR SDRAM working frequency combination corresponding to frame processing duration less than the target frame processing duration as the target CPU-DDR SDRAM working frequency combination.

In one embodiment, the obtaining unit is further configured to: detect first actual frame processing duration spent by the CPU in processing a current frame of display image; and obtain an actual CPU-DDR SDRAM working frequency combination used when the CPU and the DDR SDRAM process the current frame of display image.

In this case, the determining unit is specifically configured to: search the first working frequency table for an actual CPU performance parameter corresponding to the actual CPU-DDR SDRAM working frequency combination; determine, in the first working frequency table, a target CPU performance parameter that meets a first preset relationship, where the first preset relationship is: the target CPU performance parameter≥(the first actual frame processing duration/the target frame processing duration)×the actual CPU performance parameter; and use a CPU-DDR SDRAM working frequency combination corresponding to the target CPU performance parameter in the first working frequency table as the target CPU-DDR SDRAM working frequency combination.

In one embodiment, the determining unit is further configured to select, from a preset second working frequency table, a target GPU working frequency that meets the target frame processing duration, where the second working frequency table includes GPU performance parameters generated when a GPU works on different working frequencies, and the GPU performance parameter is used to reflect frame processing duration required by the GPU to process one frame of display image; and the instruction unit is further configured to instruct the GPU to work on the target GPU working frequency.

In one embodiment, the obtaining unit is further configured to: detect second actual frame processing duration spent by the GPU in processing the current frame of display image; and obtain an actual GPU working frequency used when the GPU processes the current frame of display image.

In this case, the determining unit is specifically configured to: search the second working frequency table for an actual GPU performance parameter corresponding to the actual GPU working frequency; determine, in the second working frequency table, a target GPU performance parameter that meets a second preset relationship, where the second preset relationship is: the target GPU performance parameter≥(the second actual frame processing duration/the target frame processing duration)×the actual GPU performance parameter; and use a GPU working frequency corresponding to the target GPU performance parameter in the second working frequency table as the target GPU working frequency.

According to a third aspect, an embodiment of this application provides a terminal, including a CPU, a GPU, a double data rate synchronous dynamic random access memory DDR SDRAM, and a nonvolatile memory. The nonvolatile memory is configured to store a computer executable instruction, the CPU is coupled to both the DDR SDRAM and the nonvolatile memory, and when the terminal runs, the CPU executes the computer executable instruction stored in the nonvolatile memory, so that the terminal performs the following operations:

The CPU obtains a current computing-access ratio relationship as a first ratio relationship, where the computing-access ratio relationship is used to reflect a ratio between computing tasks and access tasks that are executed by the terminal. The CPU obtains, from the nonvolatile memory, a first working frequency table corresponding to the first ratio relationship, where the first working frequency table includes CPU performance parameters generated when the DDR SDRAM and the CPU work on different working frequency combinations and the computing-access ratio relationship is the first ratio relationship, and the CPU performance parameter is used to reflect frame processing duration required by the CPU to process one frame of display image. The CPU selects, from the first working frequency table, a target CPU-DDR SDRAM working frequency combination that meets preset target frame processing duration, where the target CPU-DDR SDRAM working frequency combination includes a group of a target CPU working frequency and a target DDR SDRAM working frequency. The CPU instructs the DDR SDRAM to work on the target DDR SDRAM working frequency, and instructs the CPU to work on the target CPU working frequency.

In one embodiment, that the CPU obtains a current computing-access ratio relationship as a first ratio relationship includes: the CPU obtains, from a performance monitor of the CPU, a first parameter used to reflect computing performance of the CPU and a second parameter used to reflect access performance of the DDR SDRAM; and the CPU uses a ratio between the first parameter and the second parameter as the first ratio relationship.

In one embodiment, that the CPU selects, from the first working frequency table, a target CPU-DDR SDRAM working frequency combination that meets preset target frame processing duration includes: The CPU selects, based on the CPU performance parameter in the first working frequency table, a CPU-DDR SDRAM working frequency combination corresponding to frame processing duration less than the target frame processing duration as the target CPU-DDR SDRAM working frequency combination.

In one embodiment, before the CPU selects, from the first working frequency table, a target CPU-DDR SDRAM working frequency combination that meets preset target frame processing duration, the operations further include: the CPU detects first actual frame processing duration spent by the CPU in processing a current frame of display image; and the CPU obtains an actual CPU-DDR SDRAM working frequency combination used when the CPU and the DDR SDRAM process the current frame of display image.

In one embodiment, that the CPU selects, from the first working frequency table, a target CPU-DDR SDRAM working frequency combination that meets preset target frame processing duration includes: The CPU searches the first working frequency table for an actual CPU performance parameter corresponding to the actual CPU-DDR SDRAM working frequency combination. The CPU determines, in the first working frequency table, a target CPU performance parameter that meets a first preset relationship. The first preset relationship is: the target CPU performance parameter≥(the first actual frame processing duration/the target frame processing duration)×the actual CPU performance parameter. The CPU uses a CPU-DDR SDRAM working frequency combination corresponding to the target CPU performance parameter in the first working frequency table as the target CPU-DDR SDRAM working frequency combination.

In one embodiment, the method further includes: The CPU selects, from a preset second working frequency table, a target GPU working frequency that meets the target frame processing duration, where the second working frequency table includes GPU performance parameters generated when a GPU works on different working frequencies, and the GPU performance parameter is used to reflect frame processing duration required by the GPU to process one frame of display image; and the CPU instructs the GPU to work on the target GPU working frequency.

In one embodiment, before the CPU selects, from a preset second working frequency table, a target GPU working frequency that meets the target frame processing duration, the operations further include: the CPU detects second actual frame processing duration spent by the GPU in processing the current frame of display image; and the CPU obtains an actual GPU working frequency used when the GPU processes the current frame of display image.

In one embodiment, that the CPU selects, from a preset second working frequency table, a target GPU working frequency that meets the target frame processing duration includes: The CPU searches the second working frequency table for an actual GPU performance parameter corresponding to the actual GPU working frequency. The CPU determines, in the second working frequency table, a target GPU performance parameter that meets a second preset relationship. The second preset relationship is: the target GPU performance parameter≥(the second actual frame processing duration/the target frame processing duration)×the actual GPU performance parameter. The CPU uses a GPU working frequency corresponding to the target GPU performance parameter in the second working frequency table as the target GPU working frequency.

According to a fourth aspect, an embodiment of this application provides a chip, including a CPU and a memory. The memory is configured to store a computer executable instruction, and the CPU is connected to the memory. When the chip runs, the CPU executes the computer executable instruction stored in the memory, so that the chip performs the frame rate adjustment method according to any one of the foregoing possible design methods.

According to a fifth aspect, an embodiment of this application provides a computer readable storage medium. The computer readable storage medium stores an instruction. When the instruction is run on the terminal according to any one of the foregoing possible design methods, the terminal is enabled to perform the frame rate adjustment method according to any one of the foregoing possible design methods.

According to a sixth aspect, an embodiment of this application provides a computer program product including an instruction. When the computer program product is run on the terminal according to any one of the foregoing possible design methods, the terminal is enabled to perform the frame rate adjustment method according to any one of the foregoing possible design methods.

In the embodiments of this application, names of components in the terminal do not constitute a limitation on the device. In actual implementation, these components may have other names. Provided that functions of the components are similar to those in the embodiments of this application, the components fall within the scope of the claims of this application and equivalent technologies thereof.

In addition, for technical effects brought by any one of the design manners in the second aspect to the sixth aspect, refer to technical effects brought by different design methods in the first aspect. Details are not described herein again.

DESCRIPTION OF EMBODIMENTS

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

A frame rate adjustment method provided in the embodiments of this application may be applied to any terminal having a display function, such as a mobile phone, a tablet computer, a wearable device, a vehicle-mounted device, an augmented reality (AR)/a virtual reality (VR) device, a notebook computer, a vehicle-mounted device, an ultra-mobile personal computer (UMPC), a netbook, or a personal digital assistant (PDA). This is not limited in the embodiments of this application.

Figure 1:
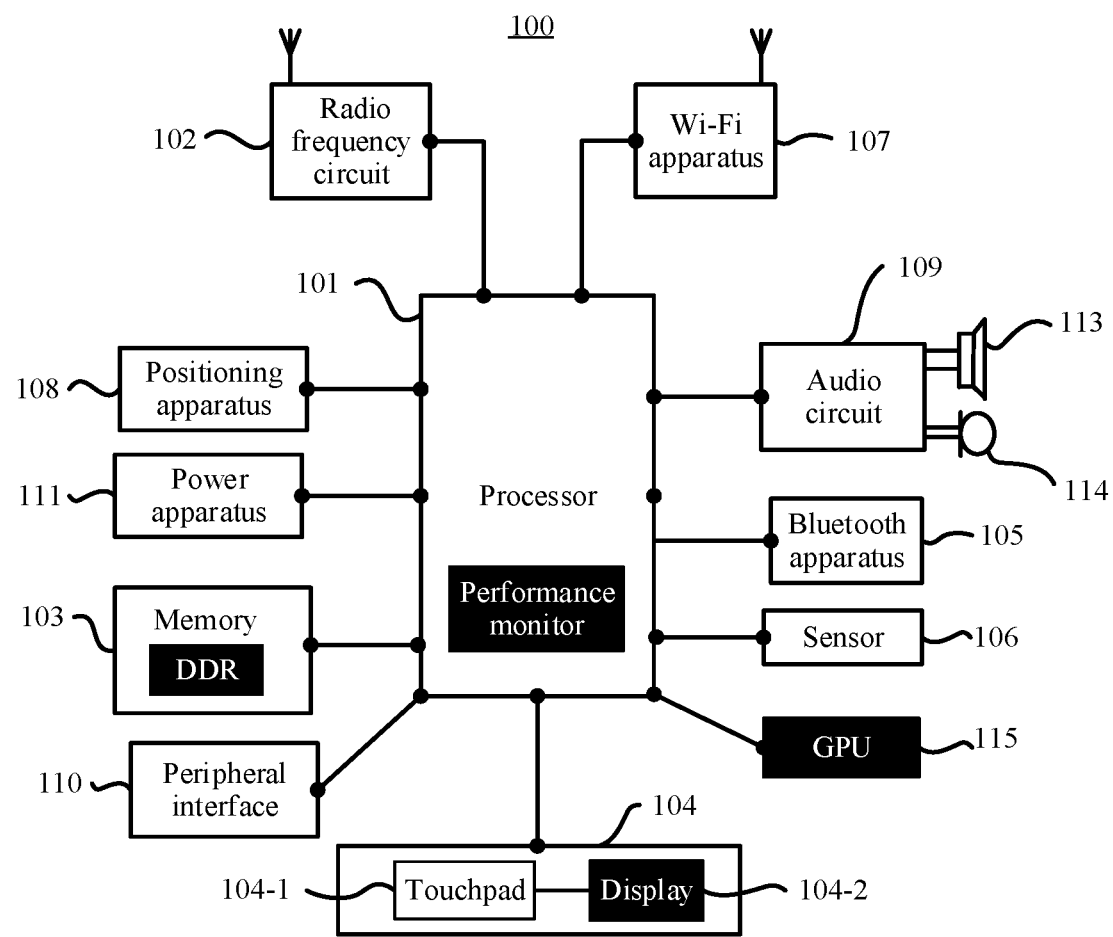
FIG. 1 is a schematic structural diagram 1 of a terminal according to an embodiment of this application.

As shown in FIG. 1, the terminal in the embodiments of this application may be a mobile phone 100. The mobile phone 100 is used as an example below to describe the embodiments in detail. It should be understood that the mobile phone 100 in the figure is merely an example of the terminal, and the mobile phone 100 may have more or fewer components than those shown in the figure, or two or more components may be combined, or different component configurations may be used.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power system 111. These components may perform communication by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, or some components may be combined, or different component configurations may be used.

The following describes in detail the components of the mobile phone 100 with reference to FIG. 1.

The processor 101 (or referred to as a CPU) is a control center of the mobile phone 100. The processor 101 is connected to parts of the mobile phone 100 by using various interfaces and cables, runs or executes an application program stored in the memory 103, and invokes data stored in the memory 103, to perform various functions of the mobile phone 100 and process data. In some embodiments, the processor 101 may include one or more processing units. For example, the processor 101 may be a chip Kirin 960 manufactured by Huawei Technologies Co., Ltd. In some embodiments of this application, the processor 101 may further include a fingerprint verification chip, configured to verify a collected fingerprint.

In addition, a performance monitor may be further disposed in the processor 101, and the performance monitor may monitor each running parameter of the CPU in a running process in real time, for example, a CPU cycle (also referred to as a machine cycle), memory usage, and duration of an idle mode.

Some parameters monitored by the performance monitor, for example, a quantity of executed instructions in a period of time, may reflect computing performance of the CPU. Correspondingly, some other parameters monitored by the performance monitor, for example, a quantity of cache misses, may reflect access performance of the CPU for the memory.

A relationship between computing tasks and access tasks that are executed by the CPU in real time in a running process may be calculated by using these parameters monitored by the performance monitor, to determine whether a current running scenario is a compute-intensive scenario or a memory-intensive scenario.

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and send related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to global system for mobile communications, general packet radio service, code division multiple access, wideband code division multiple access, long term evolution, email, short message service, and the like.

The memory 103 is configured to store an application program and data. The processor 101 runs the application program and the data that are stored in the memory 103, to perform various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phonebook) created based on use of the mobile phone 100. In addition, the memory 103 may include a high-speed random access memory (random access memory, RAM), or may include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent, and is connected to the processor 101 by using the communications bus, or the memory 103 may be integrated with the processor 101.

In the embodiments of this application, the memory 103 usually includes memory that directly communicates with the CPU. For example, the memory may be any type of storage medium such as a DDR memory (or referred to as a DDR SDRAM or a DDR). This is not limited in the embodiments of this application.

The DDR SDRAM is used as an example. When the CPU runs in a memory-intensive (memory-intensive) scenario, it indicates that the CPU needs to frequently perform a read/write operation on the DDR SDRAM. In this case, if a working frequency of the DDR SDRAM is increased, frame processing duration spent by the CPU in processing a current frame of display image can be shortened, so that a frame rate of the terminal is improved.

In addition, in the embodiments of this application, the mobile phone 100 may further include a graphics processing unit (GPU) 115. The GPU 115 is a microprocessor that specially performs image computing on a personal computer, a workstation, a game console, and some mobile devices (such as a tablet computer and a smartphone). The GPU 115 may convert and drive display information required by the mobile phone 100, provide a row scanning signal for a display 104-2, and control correct display of the display 104-2.

Specifically, in a display process, the CPU 101 may send a corresponding drawing command to the GPU 115. For example, the drawing command may be "drawing a rectangle with a length and a width of a×b in a coordinate position (x, y)". In this case, the GPU 115 may quickly calculate all pixels of the graphic according to the drawing instruction, and draw a corresponding graphic in a specified position on the display 104-2.

It can be learned that a processing speed for each frame of display image is related to both a processing capability of the CPU 101 and a processing capability of the GPU 115. After the CPU 101 sends the drawing instruction to the GPU 115, if a processing speed of the GPU 115 is excessively slow, the drawing instruction is stacked on the GPU 115 and cannot be processed in a timely manner. In this case, the GPU is a frame drawing bottleneck. Therefore, improving the processing capability of the GPU 115 (for example, increasing a working frequency of the GPU 115) may also improve the frame rate of the mobile phone.

It should be noted that the GPU 115 may be integrated into the processor 101 in a form of a function module, or may be disposed in the mobile phone 100 in an independent entity form (for example, a graphics card). This is not limited in the embodiments of the present invention.

The touchscreen 104 may specifically include a touchpad 104-1 and the display 104-2.

The touchpad 104-1 may collect a touch operation performed by a user of the mobile phone 100 on or near the touchpad 104-1 (for example, an operation performed by the user on the touchpad 104-1 or near the touchpad 104-1 by using any suitable object such as a finger or a stylus), and send collected touch information to another component (such as the processor 101). The touch operation performed by the user near the touchpad 104-1 may be referred to as a floating touch. The floating touch may mean that the user does not need to directly touch the touchpad for selecting, moving, or dragging an object (for example, an icon), but the user needs only to be near the terminal to perform a desired function. In addition, the touchpad 104-1 may be implemented in a plurality of types such as a resistive type, a capacitive type, an infrared type, and a surface acoustic wave type.

The display (also referred to as a display device) 104-2 may be configured to display information entered by the user or information provided for the user and various menus of the mobile phone 100. The display 104-2 may be configured in a form such as a liquid crystal display or an organic light-emitting diode. The touchpad 104-1 may cover the display 104-2. When detecting a touch operation on or near the touchpad 104-1, the touchpad 104-1 transfers the touch operation to the processor 101 to determine a type of the touch operation. Then, the processor 101 may provide a corresponding visual output on the display 104-2 based on the type of the touch operation. Although in FIG. 1, the touchpad 104-1 and the display 104-2 are used as two independent components to implement input and output functions of the mobile phone 100, in some embodiments, the touchpad 104-1 and the display 104-2 may be integrated to implement the input and output functions of the mobile phone 100.

The mobile phone 100 may further include the Bluetooth apparatus 105, configured to exchange data between the mobile phone 100 and another short-range terminal (for example, a mobile phone or a smartwatch). In the embodiments of this application, the Bluetooth apparatus may be a device such as an integrated circuit or a Bluetooth chip.

The mobile phone 100 may further include at least one type of sensor 106, such as a fingerprint collection device, a light sensor, a motion sensor, and another sensor. In one embodiment, the fingerprint collection device may be configured on the back side of the mobile phone 100 (for example, below a rear-facing camera), or the fingerprint collection device may be configured on the front side of the mobile phone 100 (for example, below the touchscreen 104). For another example, the fingerprint collection device may be configured on the touchscreen 104 to implement a fingerprint recognition function. In other words, the fingerprint collection device may be integrated with the touchscreen 104 to implement the fingerprint recognition function of the mobile phone 100. The light sensor may include an ambient light sensor and a proximity sensor. The ambient light sensor may adjust luminance of the display on the touchscreen 104 based on intensity of ambient light, and the proximity sensor may power off the display when the mobile phone 100 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between landscape mode and portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured on the mobile phone 100. Details are not described herein.

The Wi-Fi apparatus 107 is configured to provide the mobile phone 100 with network access that complies with a Wi-Fi-related standard or protocol. The mobile phone 100 may access a Wi-Fi access point by using the Wi-Fi apparatus 107, to help the user send and receive an email, browse a web page, access streaming media, and the like. The Wi-Fi apparatus 107 provides wireless broadband internet access for the user. In some other embodiments, the Wi-Fi apparatus 107 may be used as a Wi-Fi wireless access point, and may provide Wi-Fi network access for another terminal.

The positioning apparatus 108 is configured to provide a geographic location for the mobile phone 100. It can be understood that the positioning apparatus 108 may be specifically a receiver of a positioning system such as a global positioning system (GPS), a BeiDou navigation satellite system, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates with the positioning apparatus 108 (namely, a GPS receiver) of the terminal, for example, the mobile phone 100, through a wireless communications network, and provides positioning assistance. In some other embodiments, the positioning apparatus 108 may be a positioning technology based on a Wi-Fi access point. Each Wi-Fi access point has a globally unique media access control (media access control, MAC) address, and the terminal can scan and collect a broadcast signal of a nearby Wi-Fi access point when Wi-Fi is enabled. Therefore, a MAC address that is broadcast by the Wi-Fi access point can be obtained. The terminal sends such data (for example, the MAC address) that can identify the Wi-Fi access point to a location server through the wireless communications network. The location server retrieves a geographic location of each Wi-Fi access point, calculates a geographic location of the terminal with reference to a strength of the Wi-Fi broadcast signal, and sends the geographic location of the terminal to the positioning apparatus 108 of the terminal.

The audio circuit 109, a speaker 113, and a microphone 114 may provide an audio interface between the user and the mobile phone 100. The audio circuit 109 may transmit, to the speaker 113, an electrical signal converted from received audio data, and the speaker 113 converts the electrical signal into a sound signal for output. In addition, the microphone 114 converts a collected sound signal into an electrical signal. The audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone 100, an external memory, or a subscriber identification module card). For example, the mobile phone 100 is connected to the mouse by using a universal serial bus (universal serial bus, USB) interface, and the mobile phone 100 is connected, by using a metal contact on a card slot of the subscriber identification module card, to the subscriber identification module (subscriber identification module, SIM) card provided by a telecommunications operator. The peripheral interface 110 may be configured to couple the external input/output peripheral device to the processor 101 and the memory 103.

The mobile phone 100 may further include the power apparatus 111 (for example, a battery and a power management chip) that supplies power to the components. The battery may be logically connected to the processor 101 by using the power management chip, so that functions such as charging management, discharging management, and power consumption management are implemented by using the power apparatus 111.

Although not shown in FIG. 1, the mobile phone 100 may further include a camera (a front-facing camera and/or a rear-facing camera), a flash, a micro projection apparatus, a near field communication (NFC near field communication, NFC) apparatus, and the like. Details are not described herein.

When the mobile phone 100 performs display, the display 104-2 may display, based on a scanning signal provided by the GPU 115, each frame of display image buffered in the GPU 115. A frame rate of the display 104-2 during display is usually set to a fixed value (for example, 60 Hz). In other words, frame processing duration spent by the CPU or the GPU in generating each frame of display image needs to be less than 16.7 ms. Therefore, if frame processing duration spent by the CPU or the GPU in processing one frame of display image is far greater than 16.7 ms, a frame loss occurs. In this case, the frame rate jitters when the display 104-2 performs display, affecting smoothness of display images.

The CPU needs to interact with the DDR SDRAM when processing each frame of display image. Therefore, when the frame rate jitters during display of the mobile phone 100, adjusting only a working frequency of the CPU cannot ensure that the frame processing duration for each frame of display image is less than 16.7 ms.

Therefore, in the embodiments of this application, the terminal may detect, in real time, a relationship between computing tasks and access tasks in a current display scenario. Because the CPU is mainly configured to execute the computing tasks, and the DDR SDRAM is mainly configured to execute the access tasks, when the frame rate jitters, if the computing tasks in the current display scenario are relatively intensive, the terminal may set the CPU to work on a relatively high working frequency, so that the CPU can process these computing tasks more quickly. Correspondingly, if the access tasks are relatively intensive in the current display scenario, the terminal may set the DDR SDRAM to work on a relatively high working frequency, so that the DDR SDRAM can process these access tasks more quickly. In this way, the terminal can dynamically and properly set working frequencies of the DDR SDRAM and the CPU based on distribution statuses of the computing tasks and the access tasks in the current display scenario, so that the frame processing duration for each frame of display image is stable at about 16.7 ms, to improve the smoothness of display images.

Figure 2:
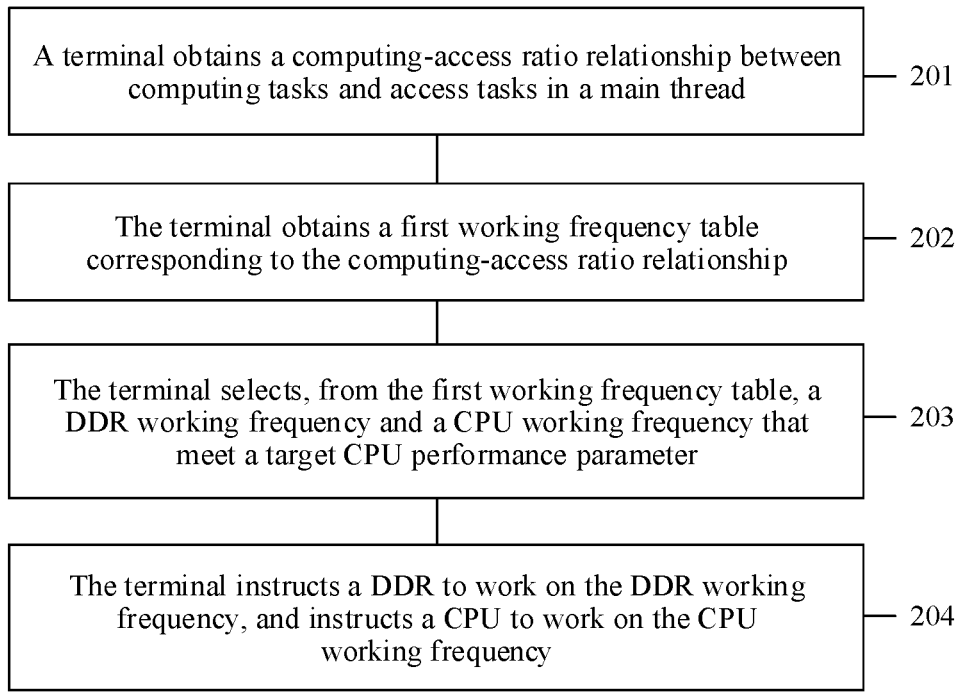
FIG. 2 is a schematic flowchart 1 of a frame rate adjustment method according to an embodiment of this application.

A frame rate adjustment method provided in an embodiment of this application is described below in detail with reference to specific embodiments. As shown in FIG. 2, the method includes the following operations.

S201. A terminal obtains a computing-access ratio relationship between computing tasks and access tasks in a main thread.

A larger value of a computing-access ratio indicates that there are currently a larger quantity of computing tasks, and a CPU needs to frequently execute the computing tasks, to ensure that each frame of display image can be processed within preset frame processing duration (for example, 16.7 ms). Correspondingly, a smaller value of the computing-access ratio indicates that there are currently a larger quantity of access tasks, and the CPU needs to frequently interact with a DDR SDRAM to execute the access tasks, to ensure that each frame of display image can be processed within the preset frame processing duration.

In operation S201, when a program is started, an operating system (OS) of the terminal creates a main thread (main thread) to start to run. In this case, as shown in FIG. 3, the terminal may obtain an identifier (for example, an ID of the main thread) of the main thread, and then, the terminal obtains, from a performance monitor (performance monitor) of the CPU by using the ID of the main thread, target parameters used when the CPU runs the main thread.

The target parameters include a first parameter (for example, an instruction quantity) used to reflect computing performance of the CPU, and a second parameter (for example, a cache miss quantity) used to reflect access performance of the DDR SDRAM.

Figure 3:
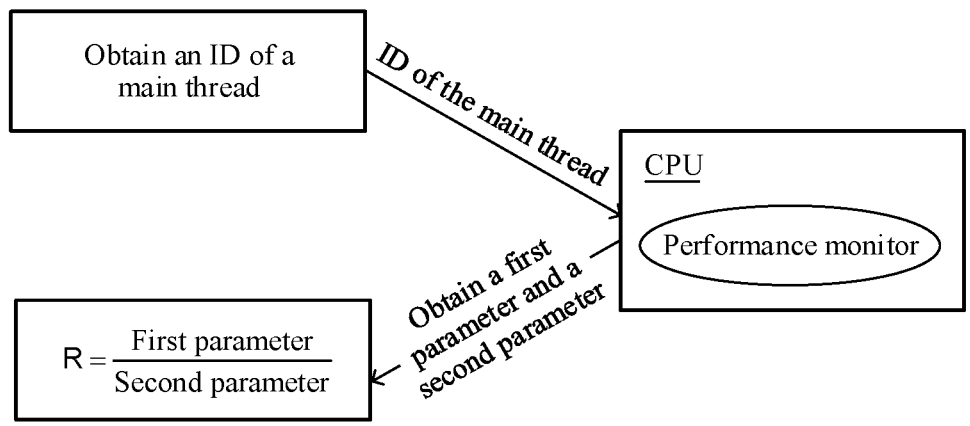
FIG. 3 is a schematic principle diagram 1 of a frame rate adjustment method according to an embodiment of this application.

In this way, still referring to FIG. 3, the terminal may calculate, based on the obtained first parameter and second parameter, a ratio relationship between the computing tasks and the access tasks when the main thread runs, namely, the computing-access ratio relationship. For example, a ratio parameter R may be set, to reflect the computing-access ratio relationship. R=first parameter/second parameter=instruction quantity/cache miss quantity.

Certainly, in addition to the instruction quantity and the cache miss quantity, the terminal may further calculate the computing-access ratio relationship based on another parameter monitored by the performance monitor, for example, a CPU running cycle. In addition, a manner of calculating the computing-access ratio relationship is not limited to the calculation manner of dividing the first parameter by the second parameter. This is not limited in this embodiment of this application.

In addition, after obtaining the ID of the main thread, the terminal may periodically obtain the target parameters from the performance monitor, calculate the computing-access ratio relationship between the computing tasks and the access tasks in the main thread, and then perform the following operations S202 to S204. In this way, the terminal can adjust working frequencies of the CPU and the DDR SDRAM in real time based on the current computing-access ratio relationship, so that a display frame rate is stable on a target frequency (for example, 60 Hz).

For example, when periodically obtaining the target parameters, the terminal may set the period to target frame processing duration (for example, 16.7 ms) corresponding to the target frequency (for example, 60 Hz). In other words, theoretically, the terminal may obtain target parameters generated when the CPU processes each frame of display image. In this way, the terminal can adjust working frequencies of the CPU and the DDR SDRAM in a next frame each time based on a computing-access ratio relationship in a current frame, so that the CPU and the DDR SDRAM can quickly handle a frame rate jitter in a timely manner, and the frame rate is more stable.

In some other embodiments of this application, the terminal may further prestore computing-access ratio relationships of different applications during running. For example, it may be determined, in advance through testing or the like, that a game application A is a memory-intensive application during running, and a ratio parameter R that reflects a computing-access ratio relationship of the game application A is 0.1; and a decompress application B is a compute-intensive application during running, and a ratio parameter R that reflects a computing-access ratio relationship of the decompress application B is 3.

In this case, the terminal may obtain an ID of a currently running main thread or a package name (packname) of a currently running application, to determine a specific currently running application, for example, the game application A. Further, the terminal may find, in the prestored computing-access ratio relationships of the different applications during running, that the ratio parameter R corresponding to the game application A is 0.1, to obtain the computing-access ratio relationship between computing tasks and access tasks that exists when the game application A runs currently.

Similarly, the terminal may further prestore computing-access ratios existing when the terminal is in different running scenarios (for example, a payment scenario and a sport scenario) or when the terminal provides different services (for example, a location service and an input method service). In this case, the terminal may determine a current computing-access ratio relationship between computing tasks and access tasks based on a running scenario or service currently detected in real time. This is not limited in this embodiment of this application.

S202. The terminal obtains a first working frequency table corresponding to the computing-access ratio relationship. The first working frequency table includes performance parameters generated when the DDR SDRAM and the CPU work on different working frequency combinations in the ratio relationship.

Figure 4:
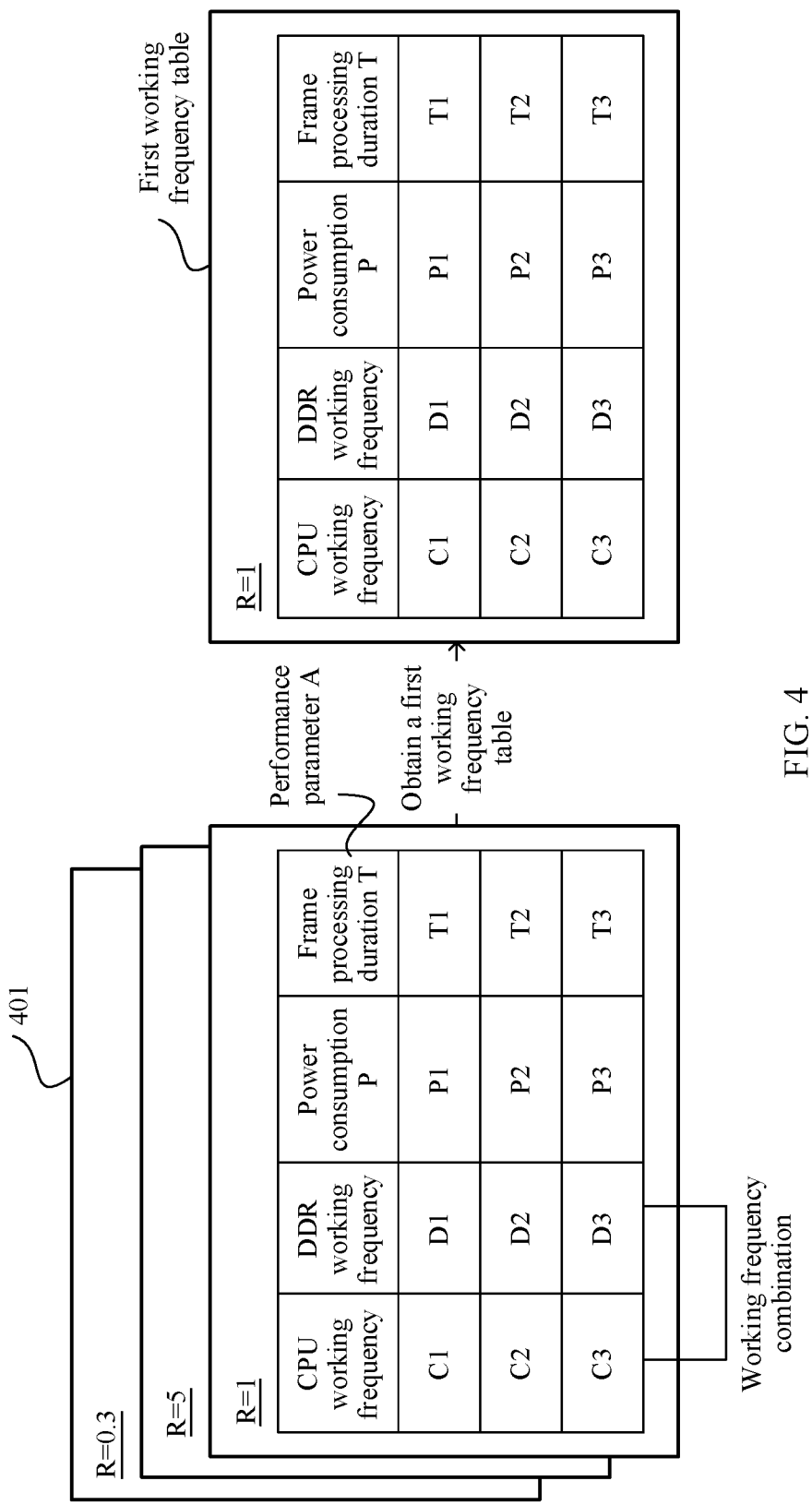
FIG. 4 is a schematic principle diagram 2 of a frame rate adjustment method according to an embodiment of this application.

As shown in FIG. 4, the terminal prestores CPU-DDR SDRAM working frequency tables 401 corresponding to different computing-access ratios. Each CPU-DDR SDRAM working frequency table 401 indicates performance parameters (performance) A (or referred to as CPU performance parameters) generated when the DDR SDRAM and the CPU run on different working frequency combinations when the terminal runs a program of a specific computing-access ratio. The performance parameter A may reflect frame processing duration T required by the CPU to process one frame of display image. For example, the performance parameter A may be a quantity of instructions processed by the CPU in a time unit. Usually, a larger value of the performance parameter A indicates shorter frame processing duration T required by the CPU to process one frame of display image. In other words, the performance parameter A is inversely proportional to the frame processing duration T.

For example, in the CPU-DDR SDRAM working frequency tables 401 shown in FIG. 4, an example in which the frame processing duration T required by the CPU to process one frame of display image is used as the performance parameter A is described. It may be understood that the item of the frame processing duration T in FIG. 4 may also be replaced with any parameter f(T) associated with the parameter: the frame processing duration T. In other words, the performance parameter A=f(T). This is not limited in this embodiment of this application.

In addition, still referring to FIG. 4, the CPU-DDR SDRAM working frequency tables 401 may further include parameters such as power consumption P caused by the DDR SDRAM and the CPU when the DDR SDRAM and the CPU run on different working frequency combinations. This is not limited in this embodiment of this application.

In this case, the terminal may query, based on the computing-access ratio relationship obtained in operation S201, the CPU-DDR SDRAM working frequency table (namely, the first working frequency table) corresponding to the computing-access ratio relationship. For example, if a ratio parameter R obtained in operation S201 is 1.2, still referring to FIG. 4, the terminal may find, in the CPU-DDR SDRAM working frequency tables 401, that a computing-access ratio closest to R that is 1.2 is 1, and further, the terminal may use a CPU-DDR SDRAM working frequency table in which the calculation-access ratio is 1 as the first working frequency table. The first working frequency table records power consumption P caused when the DDR SDRAM and the CPU run on different working frequency combinations and frame processing duration T for each frame when the calculation-access ratio is 1.

It should be noted that, in this embodiment of this application, the first working frequency table corresponding to the computing-access ratio relationship is a CPU-DDR SDRAM working frequency table, in the plurality of prestored CPU-DDR SDRAM working frequency tables, with a computing-access ratio relationship (for example, the ratio parameter R) that is the same as or closest to the computing-access ratio relationship calculated in operation S201.

In addition, other than the manner of storing, in a form of a table, the performance parameters generated when the DDR SDRAM and the CPU run on different working frequency combinations, the terminal may alternatively establish correspondences among different computing-access ratio relationships, different working frequency combinations of the DDR SDRAM and the CPU, and different performance parameters A in a manner such as another data structure (for example, an index). This is not limited in this embodiment of this application.

S203. The terminal selects, from the first working frequency table, a DDR SDRAM working frequency and a CPU working frequency that meet a target CPU performance parameter.

In some embodiments of this application, an example in which the target CPU performance parameter A is target frame processing duration less than or equal to 16.7 ms is used. In operation S203, the terminal may select, from the first working frequency table shown in FIG. 4, a working frequency combination of the DDR SDRAM and the CPU that corresponds to frame processing duration T less than or equal to 16.7 ms. A DDR SDRAM working frequency in the working frequency combination may be set to a working frequency on which the DDR SDRAM works in a next frame, and a CPU working frequency in the working frequency combination may be set to a working frequency on which the CPU works in the next frame.

In addition, when there are a plurality of working frequency combinations corresponding to the frame processing duration T less than or equal to 16.7 ms in the first working frequency table, the terminal may select a working frequency combination corresponding to lowest power consumption P. In this way, when the terminal works on a DDR SDRAM working frequency and a CPU working frequency in the working frequency combination, the frame rate can be ensured to be stable at 60 Hz and power consumption overheads required when the DDR SDRAM and CPU work can be minimized.

In some other embodiments of this application, an example in which the target CPU performance parameter A is a function of the frame processing duration T is used. In other words, A=f(T). The performance parameter A is inversely proportional to the frame processing duration T. In this case, the terminal may further detect actual frame processing duration spent by the CPU in processing each frame of display image, and further select, from the first working frequency table based on the actual frame processing duration, a DDR SDRAM working frequency and a CPU working frequency that meet the target frame processing duration.

Figure 5:
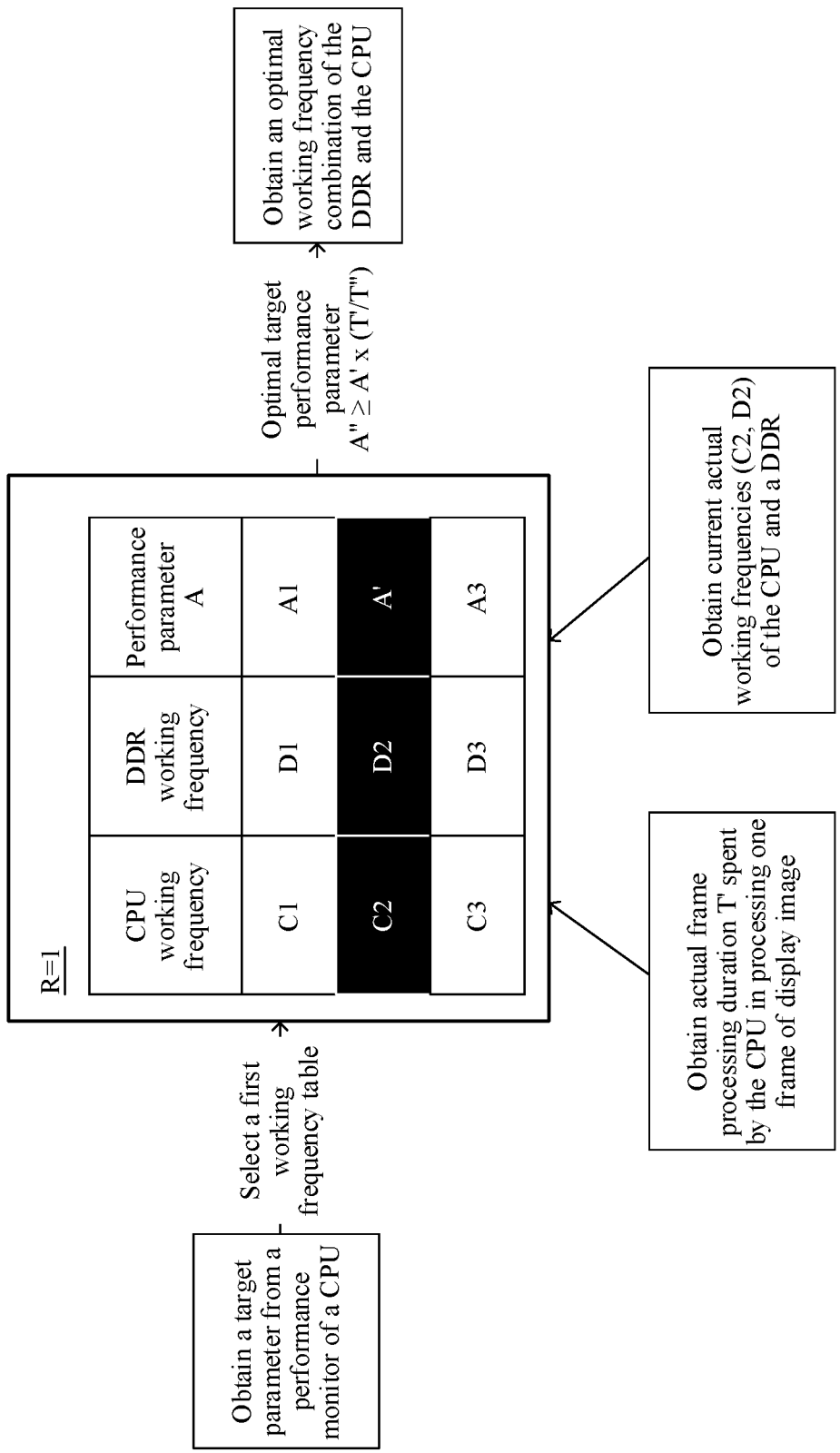
FIG. 5 is a schematic principle diagram 3 of a frame rate adjustment method according to an embodiment of this application.

For example, as shown in FIG. 5, when the terminal obtains the target parameter from the performance monitor of the CPU, the terminal may further obtain actual frame processing duration T' spent by the CPU in processing one frame of display image in this case. In an example of the Android operating system, when displaying each frame of display image, the terminal may start a surfaceflinger service in the Android operating system, and the surfaceflinger service may calculate a location of each surface in a final composed image by invoking a series of functions. Then, the HWComposer or an open graphics library (OpenGL) generates a final display buffer. Finally, a display displays display content buffered in the buffer.

In this case, the terminal may stub a function (for example, an enqueue buffer function) that is executed when processing of each frame of display image starts in the surfaceflinger service, and stub a function (for example, a release buffer function) that is executed when processing of each frame of display image ends in the surfaceflinger service. In this way, a time difference between the two stubs can be used as the actual frame processing duration T' spent by the CPU in processing one frame of display image.

Still referring to FIG. 5, in addition to the actual frame processing duration T' spent by the CPU in processing one frame of display image, the terminal may further obtain current actual working frequencies of the CPU and the DDR SDRAM. For example, the terminal may detect the current actual working frequencies of the CPU and the DDR SDRAM during running. Alternatively, because working frequencies on which the CPU and the DDR SDRAM process each frame of display image are determined by the terminal by using operations S201 to S203, the terminal may buffer working frequencies of the CPU and the DDR SDRAM that are latest obtained. In this way, the latest obtained working frequencies of the CPU and the DDR SDRAM that are buffered in the terminal are the current actual working frequencies of the CPU and the DDR SDRAM during running.

The terminal may determine, in the first working frequency table obtained in operation S202, a performance parameter A' corresponding to the actual working frequencies of the CPU and the DDR SDRAM during running (a performance parameter A shown in FIG. 5 is a function using frame processing duration T as an independent variable, in other words, the performance parameter A=f(T)). If the target frame processing duration T" of the terminal is not greater than 16.7 ms, and the current actual frame processing duration of the terminal is T', an optimal target performance parameter A" in the first working frequency table needs to meet the following relationship:

$$A''\times T''\geq A'\times T';$$

in other words, $A''\geq A'\times(T'/T'')$.

In this way, the terminal can determine, in the first working frequency table based on the target frame processing duration T" (16.7 ms), the actual frame processing duration T', and the performance parameter A' corresponding to the actual working frequencies of the CPU and the DDR SDRAM, one or more target performance parameters A" that meet the foregoing relationship, and one or more working frequency combinations of the DDR SDRAM and the CPU that correspond to the one or more target performance parameters A".

In addition, when there are a plurality of determined target performance parameters A", there are also a plurality of working frequency combinations of the DDR SDRAM and the CPU that correspond to the plurality of target performance parameters A". If the CPU-DDR SDRAM working frequency tables 401 further include power consumption P caused when the DDR SDRAM and the CPU run on different working frequency combinations, the terminal may select, in the plurality of working frequency combinations of the DDR SDRAM and the CPU that correspond to the plurality of target performance parameters A", a working frequency combination corresponding to lowest power consumption P as working frequencies on which the DDR SDRAM and CPU process a next frame of display image, to reduce power consumption of the terminal.

Alternatively, because the terminal may periodically and continuously repeat operations S201 to S203 to obtain DDR SDRAM working frequencies and CPU working frequencies that meet the target CPU performance parameter, the terminal may predict working frequencies of the DDR SDRAM and the CPU in a next frame or a plurality of next frames based on the DDR SDRAM working frequencies and the CPU working frequencies that are recently determined by the terminal. For example, a largest one among three DDR SDRAM working frequencies determined in latest three times and a largest one among three CPU working frequencies determined in the latest three times are used as subsequent working frequencies of the DDR SDRAM and the CPU.

Herein, by using operation S203, the terminal may select, from the first working frequency table, the DDR SDRAM working frequency and the CPU working frequency that meet the target CPU performance parameter, and use the DDR SDRAM working frequency and the CPU working frequency as working frequencies on which the DDR SDRAM and the CPU work in a next frame. In this way, frame processing duration spent by the CPU in processing one frame of display image in subsequent work is steadily less than 16.7 ms, so that smoothness of display images is improved.

It should be noted that a process in which the terminal obtains the actual frame processing duration T1 in FIG. 5 may also be periodic, and a period in which the terminal obtains the actual frame processing duration T1 may be the same as or different from the period in which the terminal obtains the target parameter from the performance monitor in operation S201. This is not limited in this embodiment of this application.

S204. The terminal instructs the DDR SDRAM to work on the DDR SDRAM working frequency, and instructs the CPU to work on the CPU working frequency.

In operation S204, the terminal may send the DDR SDRAM working frequency and the CPU working frequency determined in operation S203 to a frequency modulator of the terminal, and the frequency modulator adjusts the DDR SDRAM working frequency and the CPU working frequency, so that the DDR SDRAM and the CPU each can work on a working frequency that meets the current computing-access ratio relationship. In this way, the display frame rate of the terminal is stabilized, and power consumption and heat production of the terminal are reduced.

The actions of the terminal in the foregoing operations S201 to S204 may be performed by the processor 101 in FIG. 1 based on the computer instruction or the data stored in the memory 103. This is not limited in this embodiment of this application.

In some other embodiments of this application, the frame processing duration for each frame of display image is related to the CPU working frequency and the DDR SDRAM working frequency, and further related to a GPU working frequency. Therefore, on the basis of the frame rate adjustment procedure shown in FIG. 4, the terminal may further set, based on actual frame processing duration spent by a GPU in processing one frame of display image, the GPU to work on a GPU working frequency that meets a target GPU performance parameter.

Figure 6:
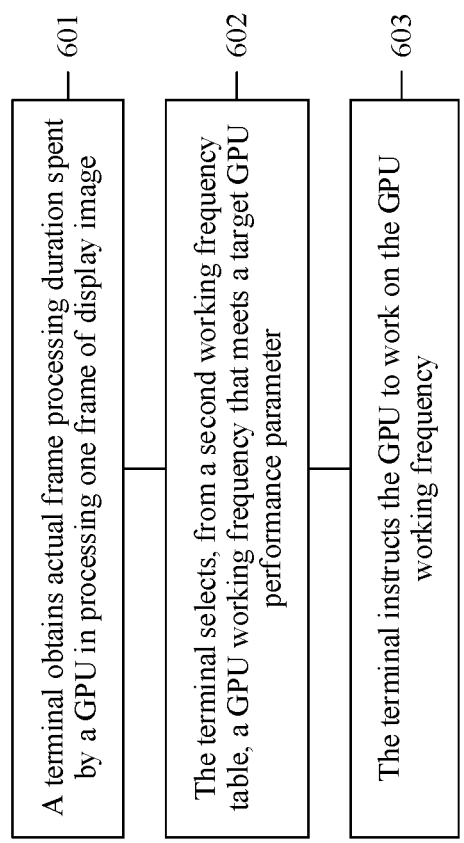
FIG. 6 is a schematic flowchart 2 of a frame rate adjustment method according to an embodiment of this application.

In this case, as shown in FIG. 6, the frame rate adjustment method provided in this embodiment of this application further includes the following operations S601 to S603.

S601. The terminal obtains the actual frame processing duration spent by the GPU in processing one frame of display image.

Figure 7A:
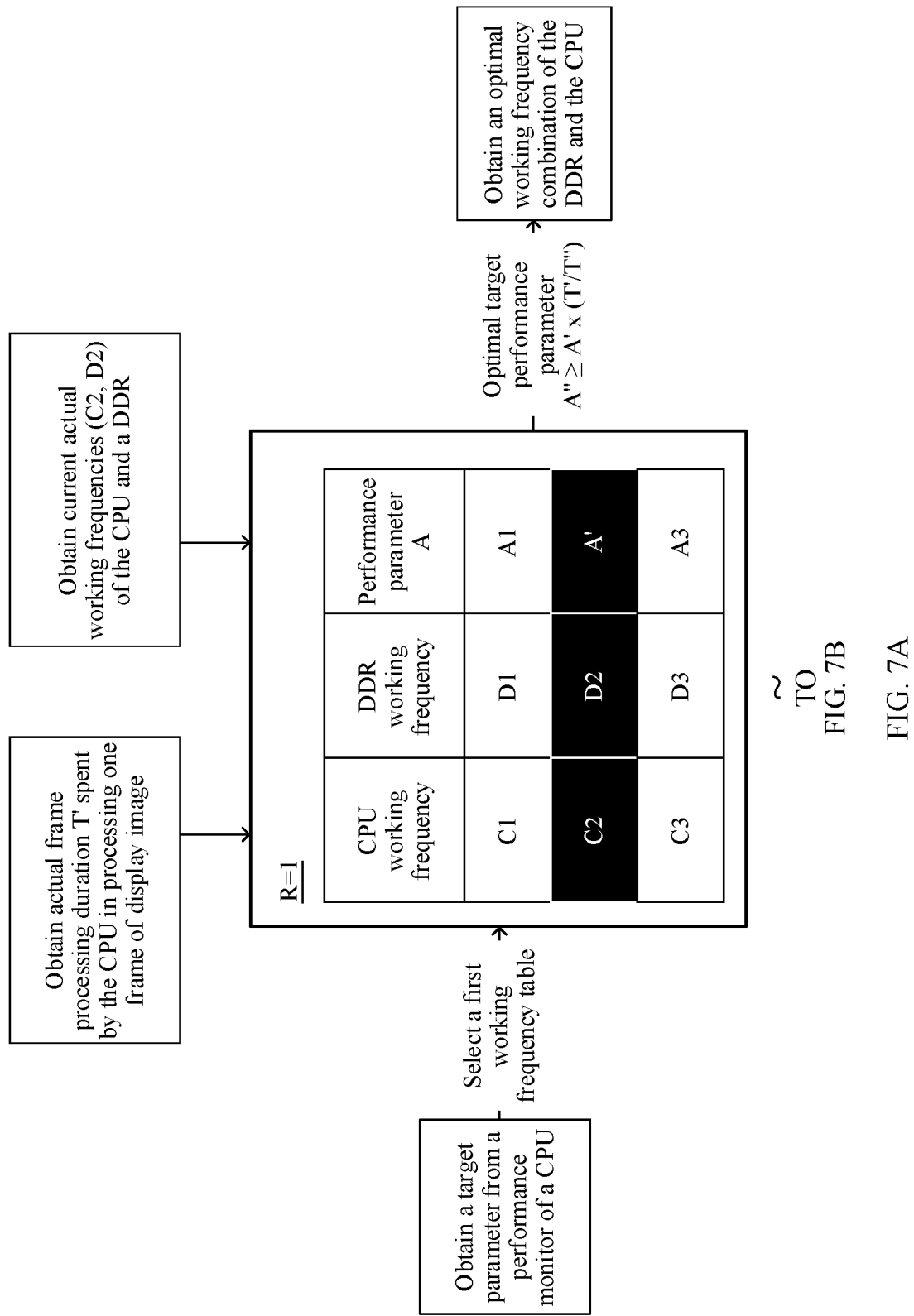
FIG. 7A and FIG. 7B are a schematic principle diagram 4 of a frame rate adjustment method according to an embodiment of this application.
Figure 7B:
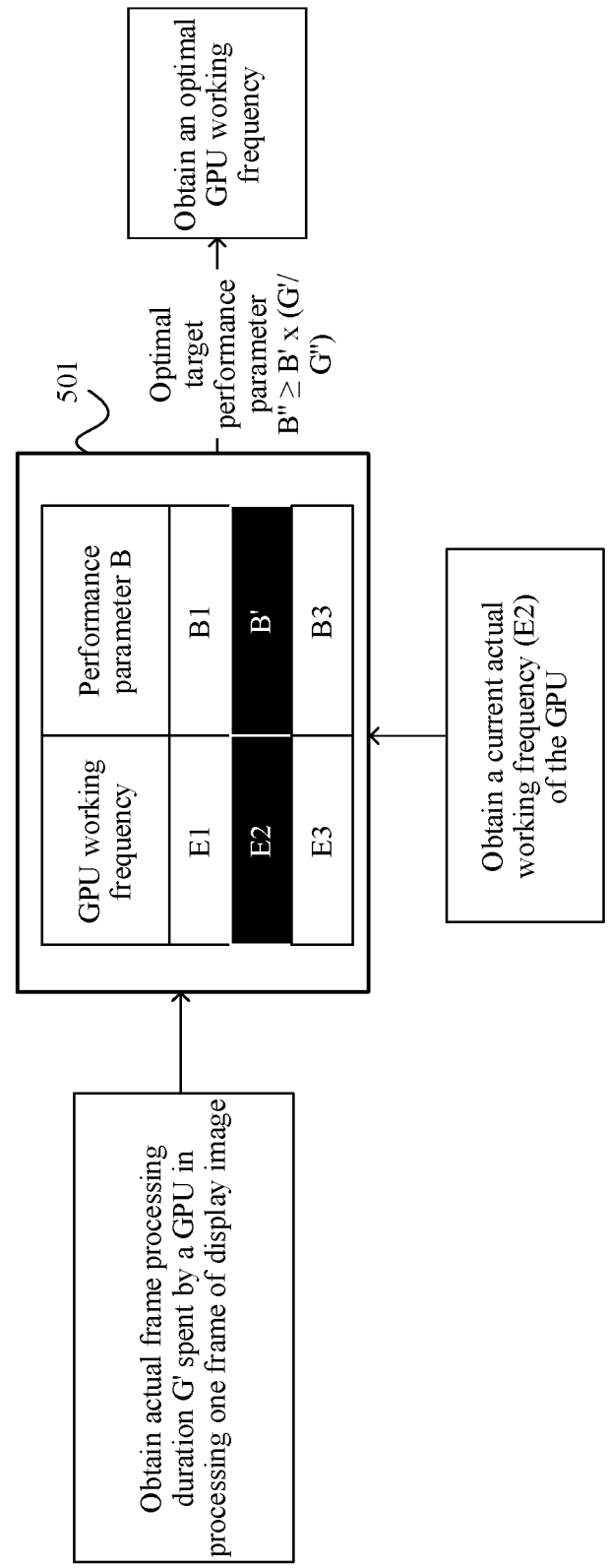

On the basis of the frame rate adjustment procedure shown in FIG. 5, as shown in FIG. 7A and FIG. 7B, similar to obtaining, by the terminal, the actual frame processing duration spent by the CPU in processing one frame of display image, the terminal may stub a related function (for example, a fence function) executed when a GPU driver processes each frame of display image, and further detect the actual frame processing duration G' spent by the GPU in processing one frame of display image.

S602. The terminal selects, from a second working frequency table, a GPU working frequency that meets a target GPU performance parameter.

Similar to the foregoing CPU-DDR SDRAM working frequency tables 401, as shown in FIG. 7A and FIG. 7B, the terminal may further prestore a GPU working frequency table 501 (namely, the second working frequency table) that is used to indicate performance parameters B (or may be referred to as GPU performance parameters) generated when the GPU runs on different working frequencies. The performance parameter B is used to reflect frame processing duration G required by the GPU to process one frame of display image, in other words, the performance parameter B=f(G). Similar to the performance parameter A, the performance parameter B is inversely proportional to the frame processing duration G required by the GPU to process one frame of display image.

Similar to the foregoing CPU-DDR SDRAM working frequency tables 401, the GPU working frequency table 501 may further include parameters such as power consumption P caused when the GPU runs on different working frequencies. This is not limited in this embodiment of this application.

Similar to operation S203, the terminal may select, from the GPU working frequency table 501, the GPU working frequency that meets the target GPU performance parameter.

Still referring to FIG. 7A and FIG. 7B, an example in which the target GPU performance parameter B is a function of the frame processing duration G is used. In addition to the actual frame processing duration G' spent by the GPU in processing one frame of display image, the terminal may further obtain a current actual GPU working frequency. For example, the terminal may detect the current actual GPU working frequency during running. Alternatively, because a working frequency on which the GPU processes each frame of display image may be determined by using operations S601 and S602, the terminal may buffer a GPU working frequency that is latest obtained. In this way, the latest obtained GPU working frequency buffered in the terminal is the current actual GPU working frequency during running.

The terminal may determine, in the GPU working frequency table 501, a performance parameter B' corresponding to the actual GPU working frequency during running. Because a target frame processing duration G" of the GPU is not greater than 16.7 ms, and the current actual frame processing duration of the GPU is G', an optimal target performance parameter B" in the GPU working frequency table 501 needs to meet the following relationship:

$$B''\times G''\geq B'\times G',$$

in other words, $B''\geq B'\times(G/G'')$.

In this way, the terminal can determine, in the GPU working frequency table 501 based on the performance parameter B' corresponding to the actual GPU working frequency, the target frame processing duration G" (16.7 ms), and the actual frame processing duration G', one or more target performance parameters B" that meet the target frame processing duration G", and one or more GPU working frequencies corresponding to the one or more target performance parameters B".

In addition, when there are a plurality of determined target performance parameters B", there are also a plurality of GPU working frequencies corresponding to the plurality of target performance parameters B". If the GPU working frequency table 501 further includes power consumption P caused when the GPU runs on different working frequencies, the terminal may select, from the plurality of GPU working frequencies corresponding to the plurality of target performance parameters B", a working frequency corresponding to lowest power consumption P as a working frequency on which the GPU processes a next frame of display image, to reduce power consumption of the terminal.

Herein, by using operation S602, the terminal may select, from the GPU working frequency table 501, the GPU working frequency that meets the target GPU performance parameter, and predict a GPU working frequency in a next frame or a plurality of next frames in a display process. In this way, frame processing duration spent by the GPU in processing one frame of display image in subsequent work is steadily less than 16.7 ms, so that smoothness of display images is improved.

It should be noted that a period in which the terminal obtains the actual frame processing duration G' of the GPU in FIG. 7A and FIG. 7B may be the same as the period in which the terminal obtains the actual frame processing duration T' of the CPU. This is not limited in this embodiment of this application.

S603. The terminal instructs the GPU to work on the GPU working frequency.

Similar to operation S204, the terminal may further send the GPU working frequency determined in operation S602 to the frequency modulator of the terminal, and the frequency modulator adjusts the GPU working frequency. In this way, with reference to operation S204, the terminal may perform joint frequency modulation on the DDR SDRAM, the CPU, and the GPU, so that the DDR SDRAM, the CPU, and the GPU each can work on a working frequency that meets a current running scenario and a processing capability of the DDR SDRAM, the CPU, or the GPU, to stabilize the display frame rate of the terminal, and reduce power consumption and heat production of the terminal.

The actions of the terminal in the foregoing operations S601 to S603 may be performed by the processor 101 in FIG. 1 based on the computer instruction or the data stored in the memory 103. This is not limited in this embodiment of this application.

In addition, in the frame rate adjustment method provided in this application, the terminal may detect frame processing duration for each frame of display image in real time. Therefore, once the terminal detects that frame processing duration for a frame does not meet the target frame processing duration (for example, 16.7 ms), working frequencies of the DDR SDRAM, CPU, and GPU in a next frame can be quickly adjusted in a timely manner, to improve a processing speed in the next frame of display image. This effectively avoids a sharp fluctuation of the frame rate due to a delay in perceiving a frame rate jitter.

Figure 8:
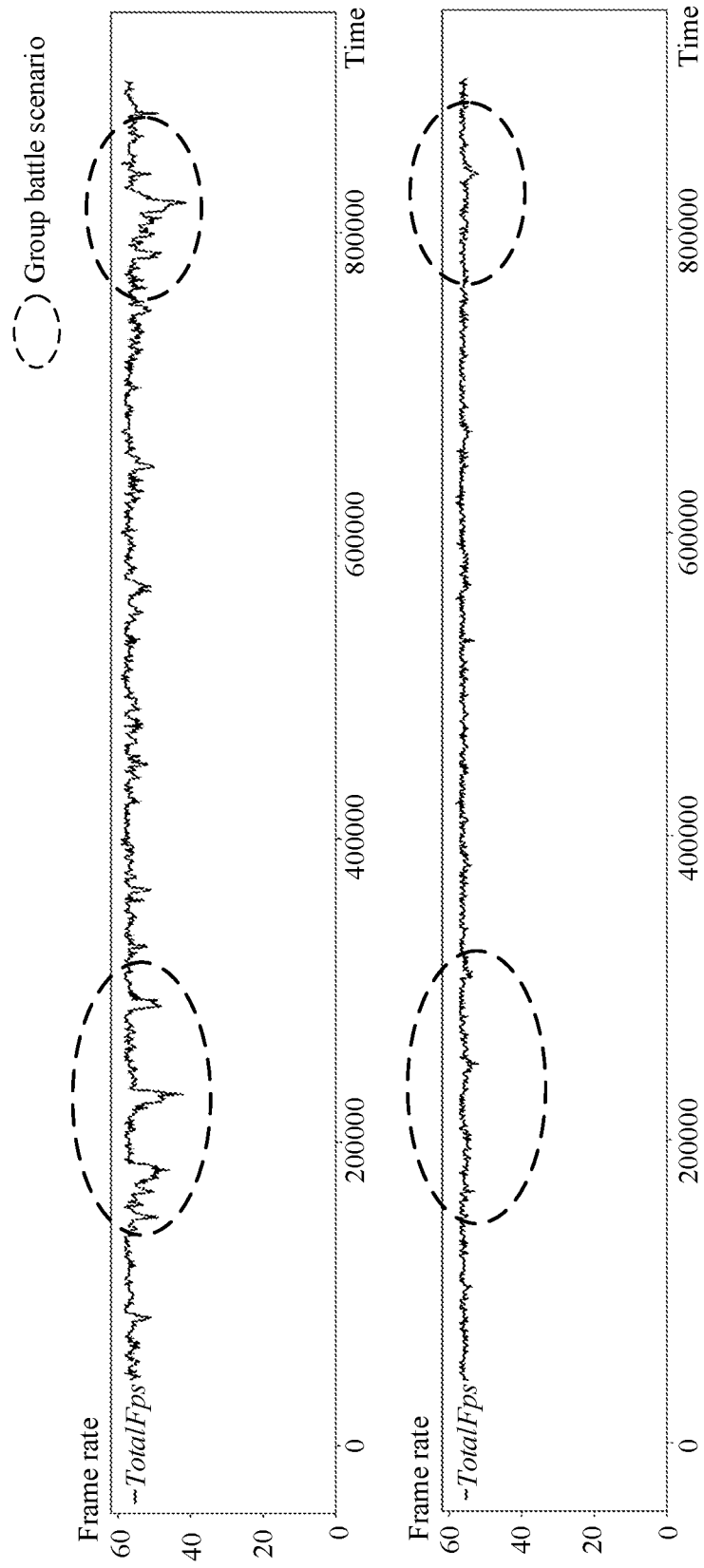
FIG. 8 is a schematic diagram of an effect of a frame rate adjustment method according to an embodiment of this application.

For example, FIG. 8 is a frame rate fluctuation diagram when a game application A is run by using the frame rate adjustment method provided in this application and a frame rate fluctuation diagram when the game application A is run by using a frame rate adjustment method in the prior art. It can be learned from FIG. 8 that, by using the frame rate adjustment method provided in this application, a minimum frame rate can be increased from 41 Hz to 52 Hz, a proportion of low frame rates less than 45 Hz is reduced from 0.33% to 0, an average frame rate of display images is increased from 55.89 Hz to 56 Hz, and smoothness of the display images is decreased from 1.68 to 1.03 (a smaller smoothness value indicates smoother images). In addition, through testing, the power consumption of the terminal is also reduced from 785 mA to 754.8 mA.

In particular, when the game application A is run according to the frame rate adjustment method provided in this application, in a group battle scenario (a position circled in FIG. 8) in which several players fight together, jitters of the display frame rate can be significantly reduced in comparison with those in the prior art, so that the display frame rate is stable at about 60 Hz.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and operations or processes may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. In actual implementation, another division manner may be used.

Figure 9:
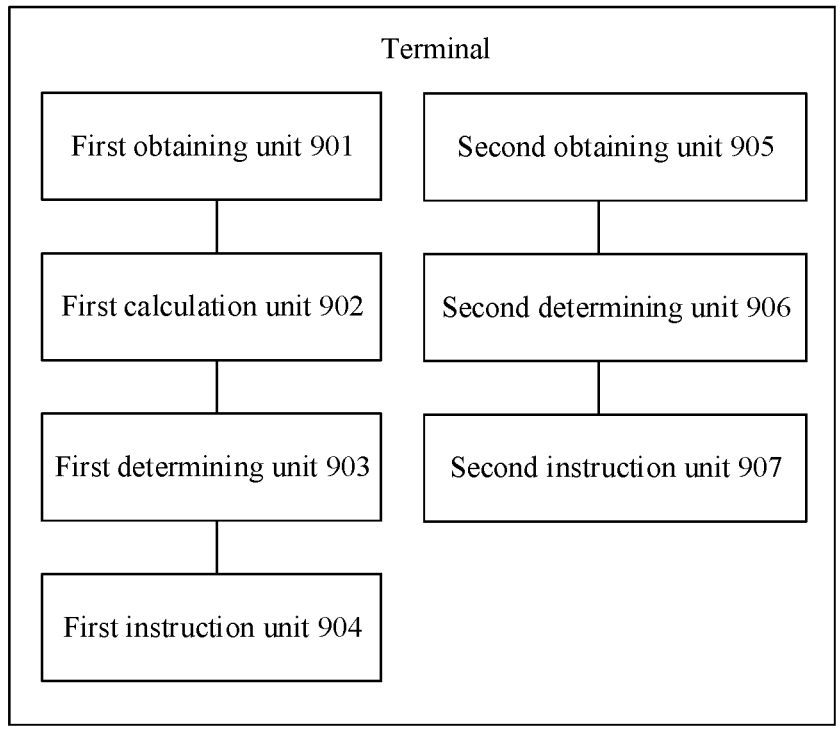
FIG. 9 is a schematic structural diagram 2 of a terminal according to an embodiment of this application.

When each function module is obtained through division based on each corresponding function, FIG. 9 is a possible schematic structural diagram of the terminal in the foregoing embodiments. The terminal is configured to implement the methods described in the foregoing method embodiments. The terminal specifically includes a first obtaining unit 901, a first calculation unit 902, a first determining unit 903, a first instruction unit 904, a second obtaining unit 905, a second determining unit 906, and a second instruction unit 907.

The first obtaining unit 901 is configured to support the terminal in performing the process S202 in FIG. 2. The first calculation unit 902 is configured to support the terminal in performing the process S201 in FIG. 2. The first determining unit 903 is configured to support the terminal in performing the process S203 in FIG. 2. The first instruction unit 904 supports the terminal in performing the process S204 in FIG. 2. The second obtaining unit 905 is configured to support the terminal in performing the process S601 in FIG. 6. The second determining unit 906 is configured to support the terminal in performing the process S602 in FIG. 6. The second instruction unit 907 supports the terminal in performing the process S603 in FIG. 6. All related content of the operations in the foregoing method embodiments may be cited in function descriptions of corresponding function modules. Details are not described herein again.

Figure 10:
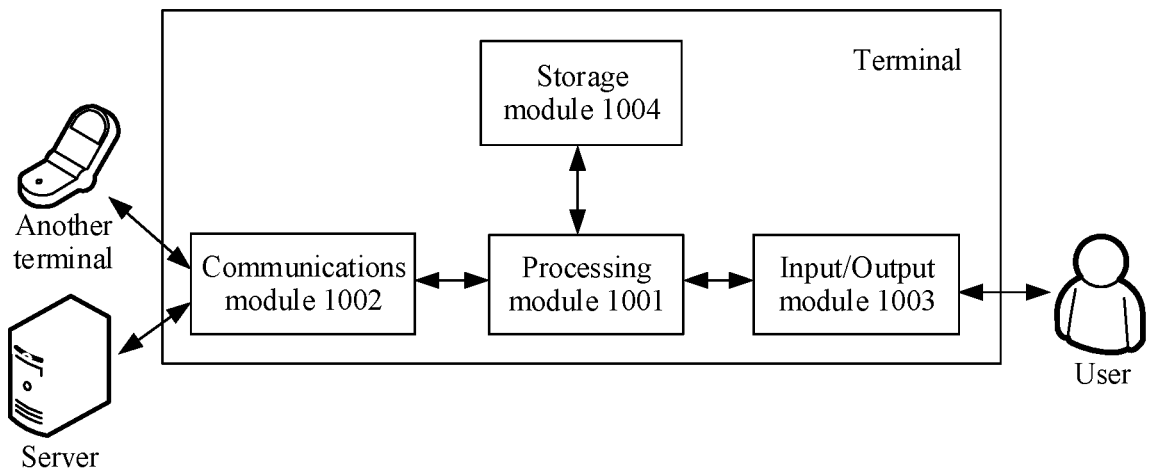
FIG. 10 is a schematic structural diagram 3 of a terminal according to an embodiment of this application.

When an integrated unit is used, the first obtaining unit 901, the first calculation unit 902, the first determining unit 903, the first instruction unit 904, the second obtaining unit 905, the second determining unit 906, and the second instruction unit 907 may be integrated into a processing module. Certainly, the terminal may further include a storage module, a communications module, an input/output module, and the like. In this case, FIG. 10 is a possible schematic structural diagram of the terminal in the foregoing embodiments. The terminal includes a processing module 1001, a communications module 1002, an input/output module 1003, and a storage module 1004.

The processing module 1001 is configured to control and manage an action of the terminal. The communications module 1002 is configured to support the terminal in communicating with another network entity. The input/output module 1003 is configured to: receive information entered by a user, or output information provided for a user and various menus of the terminal. The storage module 1004 is configured to store program code and data of the terminal.

For example, the processing module 1001 may be a processor or a controller, for example, a central processing unit (CPU), a GPU, a general-purpose processor, a digital signal processor (DSP), an application-specific integrated circuit (ASIC), a field programmable gate array (FPGA) or another programmable logic device, a transistor logic device, a hardware component, or any combination thereof. The processing module 1001 may implement or execute various example logical blocks, modules, and circuits described with reference to content disclosed in this application. The processor may be a combination of processors implementing a computing function, for example, a combination of one or more microprocessors, or a combination of a DSP and a microprocessor.

The communications module 1002 may be a transceiver, a transceiver circuit, an input/output device, a communications interface, or the like. For example, the communications module 1002 may be specifically a Bluetooth apparatus, a Wi-Fi apparatus, or a peripheral interface.

The storage module 1004 may be a memory. The memory may include a high-speed random access memory (RAM) or a DDR SDRAM, or may include a nonvolatile memory such as a magnetic disk storage device, a flash memory device, or another volatile solid-state storage device.

The input/output module 1003 may be an input/output device such as a touchscreen, a keyboard, a microphone, and a display. The display may be configured in a form such as a liquid crystal display or an organic light-emitting diode. In addition, a touchpad may be further integrated into the display, and is configured to: collect a touch event on or near the touchpad, and send collected touch information to another component (for example, the processor).

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A frame rate adjustment method, comprising:
   obtaining, by a terminal, a computing-access ratio relationship as a first ratio relationship used to reflect a ratio between computing tasks and access tasks that are executed by the terminal;
   obtaining, by the terminal, a first working frequency table corresponding to the first ratio relationship, wherein the first working frequency table comprises a central processing unit (CPU) performance parameter generated when a double data rate (DDR) synchronous dynamic random access memory (DDR SDRAM) and a CPU work on different working frequency combinations, and the CPU performance parameter is used to reflect frame processing duration required by the CPU to process one frame of a display image;
   selecting, by the terminal from the first working frequency table based on the CPU performance parameter, a target CPU-DDR SDRAM working frequency combination that meets preset target frame processing duration, wherein the target CPU-DDR SDRAM working frequency combination comprises a group of a target CPU working frequency and a target DDR SDRAM working frequency; and
   instructing, by the terminal, the DDR SDRAM to work on the target DDR SDRAM working frequency, and instructing the CPU to work on the target CPU working frequency,
   wherein the obtaining, by a terminal, a computing-access ratio relationship as a first ratio relationship comprises:
      obtaining, by the terminal from a performance monitor of the CPU, a first parameter used to reflect computing performance of the CPU and a second parameter used to reflect access performance of the DDR SDRAM, and
      using, by the terminal, a ratio between the first parameter and the second parameter as the first ratio relationship, and
   wherein the selecting, by the terminal from the first working frequency table based on the CPU performance parameter, a target CPU-DDR SDRAM working frequency combination that meets target frame processing duration comprises:
      selecting, by the terminal based on the CPU performance parameter in the first working frequency table, a CPU-DDR SDRAM working frequency combination corresponding to frame processing duration less than the target frame processing duration as the target CPU-DDR SDRAM working frequency combination.

2. The method according to claim 1, wherein before the selecting, by the terminal from the first working frequency table based on the CPU performance parameter, a target CPU-DDR SDRAM working frequency combination that meets target frame processing duration, the method further comprises:
   detecting, by the terminal, first actual frame processing duration spent by the CPU in processing a current frame of the display image; and
   obtaining, by the terminal, an actual CPU-DDR SDRAM working frequency combination used when the CPU and the DDR SDRAM process the current frame of the display image.

3. The method according to claim 2, wherein the selecting, by the terminal from the first working frequency table based on the CPU performance parameter, a target CPU-DDR SDRAM working frequency combination that meets target frame processing duration comprises:
   searching, by the terminal, the first working frequency table for an actual CPU performance parameter corresponding to the actual CPU-DDR SDRAM working frequency combination;
   determining, by the terminal in the first working frequency table, a target CPU performance parameter that meets a first preset relationship, wherein the first preset relationship is represented as follow: the target CPU performance parameter≥(the first actual frame processing duration/the target frame processing duration)*the actual CPU performance parameter; and
   using, by the terminal, a CPU-DDR SDRAM working frequency combination corresponding to the target CPU performance parameter in the first working frequency table as the target CPU-DDR SDRAM working frequency combination.

4. The method according to claim 2, wherein the first working frequency table further comprises power consumption overheads required when the DDR SDRAM and the CPU work on different working frequency combinations; and
   the target CPU-DDR SDRAM working frequency combination is a CPU-DDR SDRAM working frequency combination that meets the target frame processing duration and that corresponds to lowest power consumption overheads.

5. The method according to claim 1, further comprising:
   selecting, by the terminal from a preset second working frequency table, a target GPU working frequency that meets the target frame processing duration, wherein the second working frequency table comprises a GPU performance parameter generated when a GPU works on different working frequencies, and the GPU performance parameter is used to reflect frame processing duration required by the GPU to process one frame of the display image; and instructing, by the terminal, the GPU to work on the target GPU working frequency.

6. The method according to claim 5, wherein before the selecting, by the terminal from a preset second working frequency table, a target GPU working frequency that meets the target frame processing duration, the method further comprises:

detecting, by the terminal, second actual frame processing duration spent by the GPU in processing a current frame of the display image; and obtaining, by the terminal, an actual GPU working frequency used when the GPU processes the current frame of the display image.

7. The method according to claim 6, wherein the selecting, by the terminal from a preset second working frequency table, a target GPU working frequency that meets the target frame processing duration comprises:

searching, by the terminal, the second working frequency table for an actual GPU performance parameter corresponding to the actual GPU working frequency;

determining, by the terminal in the second working frequency table, a target GPU performance parameter that meets a second preset relationship, wherein the second preset relationship is represented as follows: the target GPU performance parameter≥(the second actual frame processing duration/the target frame processing duration)*the actual GPU performance parameter; and using, by the terminal, a GPU working frequency corresponding to the target GPU performance parameter in the second working frequency table as the target GPU working frequency.

8. The method according to claim 5, wherein the second working frequency table further comprises power consumption overheads required when the GPU works on different working frequencies; and the target GPU working frequency is a GPU working frequency that meets the target frame processing duration and that corresponds to lowest power consumption overheads.

9. A terminal, comprising:

a central processing unit (CPU);

a graphics processing unit (GPU);

a double data rate (DDR) synchronous dynamic random access memory (DDR SDRAM); and a nonvolatile memory configured to store a computer executable instruction, which when executed by the CPU, cause the CPU to perform operations, the operations including:

obtaining, by the CPU, a computing-access ratio relationship as a first ratio relationship, wherein the computing-access ratio relationship is used to reflect a ratio between computing tasks and access tasks that are executed by the terminal;

obtaining, by the CPU from the nonvolatile memory, a first working frequency table corresponding to the first ratio relationship, wherein the first working frequency table comprises a CPU performance parameter generated when the DDR SDRAM and the CPU work on different working frequency combinations, and the CPU performance parameter is used to reflect frame processing duration required by the CPU to process one frame of a display image;

selecting, by the CPU from the first working frequency table based on the CPU performance parameter, a target CPU-DDR SDRAM working frequency combination that meets preset target frame processing duration, wherein the target CPU-DDR SDRAM working frequency combination comprises a group of a target CPU working frequency and a target DDR SDRAM working frequency; and instructing, by the CPU, the DDR SDRAM to work on the target DDR SDRAM working frequency, and instructing the CPU to work on the target CPU working frequency, wherein the obtaining, by the CPU, a computing-access ratio relationship as a first ratio relationship comprises:

obtaining, by the CPU from a performance monitor of the CPU, a first parameter used to reflect computing performance of the CPU and a second parameter used to reflect access performance of the DDR SDRAM, and using, by the CPU, a ratio between the first parameter and the second parameter as the first ratio relationship, and wherein the selecting, by the CPU from the first working frequency table based on the CPU performance parameter, a target CPU-DDR SDRAM working frequency combination that meets preset target frame processing duration comprises:

selecting, by the CPU based on the CPU performance parameter in the first working frequency table, a CPU-DDR SDRAM working frequency combination corresponding to frame processing duration less than the target frame processing duration as the target CPU-DDR SDRAM working frequency combination.

10. The terminal according to claim 9, wherein before the selecting, by the CPU from the first working frequency table based on the CPU performance parameter, a target CPU-DDR SDRAM working frequency combination that meets preset target frame processing duration, the operations further comprise:

detecting, by the CPU, first actual frame processing duration spent by the CPU in processing a current frame of the display image; and obtaining, by the CPU, an actual CPU-DDR SDRAM working frequency combination used when the CPU and the DDR SDRAM process the current frame of the display image.

11. The terminal according to claim 10, wherein the selecting, by the CPU from the first working frequency table based on the CPU performance parameter, a target CPU-DDR SDRAM working frequency combination that meets preset target frame processing duration comprises:

searching, by the CPU, the first working frequency table for an actual CPU performance parameter corresponding to the actual CPU-DDR SDRAM working frequency combination;

determining, by the CPU in the first working frequency table, a target CPU performance parameter that meets a first preset relationship, wherein the first preset relationship is represented as follows: the target CPU performance parameter≥(the first actual frame processing duration/the target frame processing duration)*the actual CPU performance parameter; and using, by the CPU, a CPU-DDR SDRAM working frequency combination corresponding to the target CPU performance parameter in the first working frequency table as the target CPU-DDR SDRAM working frequency combination.

12. The terminal according to claim 9, wherein the operations further comprise:
selecting, by the CPU from a preset second working frequency table, a target GPU working frequency that meets the target frame processing duration, wherein the second working frequency table comprises a GPU performance parameter generated when the GPU works on different working frequencies, and the GPU performance parameter is used to reflect frame processing duration required by the GPU to process one frame of the display image; and
instructing, by the CPU, the GPU to work on the target GPU working frequency.

13. The terminal according to claim 12, wherein before the selecting, by the CPU from a preset second working frequency table, a target GPU working frequency that meets the target frame processing duration, the operations further comprise:
detecting, by the CPU, second actual frame processing duration spent by the GPU in processing a current frame of the display image; and
obtaining, by the CPU, an actual GPU working frequency used when the GPU processes the current frame of the display image.

14. The terminal according to claim 13, wherein the selecting, by the CPU from a preset second working frequency table, a target GPU working frequency that meets the target frame processing duration comprises:
searching, by the CPU, the second working frequency table for an actual GPU performance parameter corresponding to the actual GPU working frequency;
determining, by the CPU in the second working frequency table, a target GPU performance parameter that meets a second preset relationship, wherein the second preset relationship is represented as follows: the target GPU performance parameter≥(the second actual frame processing duration/the target frame processing duration)*the actual GPU performance parameter; and
using, by the CPU, a GPU working frequency corresponding to the target GPU performance parameter in the second working frequency table as the target GPU working frequency.

15. A chip, comprising:
a central processing unit (CPU);
a double data rate (DDR) synchronous dynamic random access memory (DDR SDRAM); and
a nonvolatile memory to store a computer executable instructions, which when executed by the CPU, cause the CPU to perform operations, the operations including:
obtaining a computing-access ratio relationship as a first ratio relationship used to reflect a ratio between computing tasks and access tasks that are executed by the CPU;
obtaining, from the nonvolatile memory, a first working frequency table corresponding to the first ratio relationship, wherein the first working frequency table comprises a CPU performance parameter generated when the DDR SDRAM and the CPU work on different working frequency combinations, and the CPU performance parameter is used to reflect frame processing duration required by the CPU to process one frame of display image;
selecting, from the first working frequency table based on the CPU performance parameter, a target CPU-DDR SDRAM working frequency combination that meets preset target frame processing duration, wherein the target CPU-DDR SDRAM working frequency combination comprises a group of a target CPU working frequency and a target DDR SDRAM working frequency; and
instructing the DDR SDRAM to work on the target DDR SDRAM working frequency, and instructing the CPU to work on the target CPU working frequency,
wherein the obtaining, by the CPU, a computing-access ratio relationship as a first ratio relationship comprises:
obtaining, by the CPU from a performance monitor of the CPU, a first parameter used to reflect computing performance of the CPU and a second parameter used to reflect access performance of the DDR SDRAM, and
using, by the CPU, a ratio between the first parameter and the second parameter as the first ratio relationship,
wherein the selecting, by the CPU from the first working frequency table based on the CPU performance parameter, a target CPU-DDR SDRAM working frequency combination that meets preset target frame processing duration comprises:
selecting, by the CPU based on the CPU performance parameter in the first working frequency table, a CPU-DDR SDRAM working frequency combination corresponding to frame processing duration less than the target frame processing duration as the target CPU-DDR SDRAM working frequency combination.

16. The chip according to claim 15, wherein before the selecting, from the first working frequency table based on the CPU performance parameter, a target CPU-DDR SDRAM working frequency combination that meets target frame processing duration, the operations further comprise:
detecting first actual frame processing duration spent by the CPU in processing a current frame of the display image; and
obtaining an actual CPU-DDR SDRAM working frequency combination used when the CPU and the DDR SDRAM process the current frame of the display image.

17. The chip according to claim 16, wherein the selecting, from the first working frequency table based on the CPU performance parameter, a target CPU-DDR SDRAM working frequency combination that meets target frame processing duration comprises:
searching the first working frequency table for an actual CPU performance parameter corresponding to the actual CPU-DDR SDRAM working frequency combination;
determining, in the first working frequency table, a target CPU performance parameter that meets a first preset relationship, wherein the first preset relationship is represented as follow: the target CPU performance parameter≥(the first actual frame processing duration/the target frame processing duration)*the actual CPU performance parameter; and
using a CPU-DDR SDRAM working frequency combination corresponding to the target CPU performance parameter in the first working frequency table as the target CPU-DDR SDRAM working frequency combination.

18. The chip according to claim 16, wherein the first working frequency table further comprises power consumption overheads required when the DDR SDRAM and the CPU work on different working frequency combinations; and the target CPU-DDR SDRAM working frequency combination is a CPU-DDR SDRAM working frequency combination that meets the target frame processing duration and that corresponds to lowest power consumption overheads.

19. The chip according to claim 15, wherein the operations further comprise:

selecting, from a preset second working frequency table, a target GPU working frequency that meets the target frame processing duration, wherein the second working frequency table comprises a GPU performance parameter generated when a GPU works on different working frequencies, and the GPU performance parameter is used to reflect frame processing duration required by the GPU to process one frame of the display image; and instructing the GPU to work on the target GPU working frequency.

* * * * *